(12) United States Patent
Kantor et al.

(10) Patent No.: US 9,646,283 B2
(45) Date of Patent: May 9, 2017

(54) SECURE PAYLOAD DELIVERIES VIA UNMANNED AERIAL VEHICLES

(71) Applicant: Verizon Patent and Licensing Inc., Arlington, VA (US)

(72) Inventors: Igor Kantor, Raleigh, NC (US); Ashok N. Srivastava, Mountain View, CA (US); Douglas M. Pasko, Bridgewater, NJ (US); Hani Batla, Teaneck, NJ (US); Gurpreet Ubhi, Nutley, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 609 days.

(21) Appl. No.: 14/282,419

(22) Filed: May 20, 2014

(65) Prior Publication Data
US 2016/0189101 A1     Jun. 30, 2016

(51) Int. Cl.
*G06Q 10/08*     (2012.01)
*B64C 39/02*     (2006.01)
(Continued)

(52) U.S. Cl.
CPC ..... *G06Q 10/08355* (2013.01); *B64C 39/024* (2013.01); *B64D 1/02* (2013.01);
(Continued)

(58) Field of Classification Search
None
See application file for complete search history.

(56) References Cited

U.S. PATENT DOCUMENTS

| | | | |
|---|---|---|---|
| 8,639,396 B1 * | 1/2014 | Hirsch | G08G 5/0008 244/76 R |
| 2012/0237028 A1 * | 9/2012 | Khazan | G05D 1/0022 380/201 |

(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.
(Continued)

*Primary Examiner* — Adam Tissot
*Assistant Examiner* — Timothy Nesley

(57) ABSTRACT

A device receives a request for a flight path for a UAV to travel from a first location to a second location, and determines capability information for the UAV based on component information of the UAV. The device calculates the flight path based on the capability information, and generates flight path instructions that include delivery confirmation instructions. The device provides the flight path instructions to the UAV to permit the UAV to travel from the first location to the second location to deliver a payload, and obtains, based on the delivery confirmation instructions, user credentials associated with a user at the second location. The device determines whether the user is an authorized recipient of the payload, based on the user credentials, and causes the UAV to selectively deliver the payload to the user based on whether the user is the authorized recipient of the payload.

20 Claims, 12 Drawing Sheets

(51) Int. Cl.
   B64D 1/02      (2006.01)
   G08G 5/00     (2006.01)
(52) U.S. Cl.
   CPC ...... *G08G 5/0034* (2013.01); *B64C 2201/128* (2013.01); *B64C 2201/146* (2013.01)

(56) References Cited

U.S. PATENT DOCUMENTS

| | | | | |
|---|---|---|---|---|
| 2014/0032034 | A1* | 1/2014 | Raptopoulos | G08G 5/0069 701/25 |
| 2014/0222248 | A1* | 8/2014 | Levien | B64C 39/024 701/2 |
| 2014/0379173 | A1* | 12/2014 | Knapp | G06Q 10/10 701/2 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.
Park et al., "Agent Technology for Coordinating UAV Target Tracking", Knowledge-Based Intelligent Information and Engineering Systems, Springer Berlin Heidelberg, 2005, 8 pages.
Kuwata et al., "Three Dimensional Receding Horizon Control for UAVs", AIAA Guidance, Navigation, and Control Conference and Exhibit, Aug. 16-19, 2004, 14 pages.
Alighanbari et al., "Filter-Embedded UAV Task Assignment Algorithms for Dynamic Environments", AIAA Guidance, Navigation, and Control Conference and Exhibit, Aug. 16-19, 2004, 15 pages.
Saad et al., "Vehicle Swarm Rapid Prototyping Testbed", American Institute of Aeronautics and Astronautics, Aerospace Conference and AIAA Unmanned . . . Unlimited Conference, 2009, 9 pages.
Richards et al., "Decentralized Model Predictive Control of Cooperating UAVs", 43$^{rd}$ IEEE Conference on Decision and Control, vol. 4, IEEE, 2004, 6 pages.
Bertuccelli et al., "Robust Planning for Coupled Cooperative UAV Missions", 43$^{rd}$ IEEE Conference on Decision and Control, vol. 3, IEEE, 2004, 8 pages.
Toksoz et al., "Automated Battery Swap and Recharge to Enable Persistent UAV Missions", AIAA Infotech@ Aerospace Conference, 2011, 10 pages.
How et al., "Multi-vehicle Experimental Platform for Distributed Coordination and Control", http://web.mit.edu/people/ihow/durip1.html, Apr. 1, 2004, 4 pages.
Chung Tin, "Robust Multi-UAV Planning in Dynamic and Uncertain Environments", Massachusetts Institute of Technology, 2004, 110 pages.
How et al., "Flight Demonstrations of Cooperative Control for UAV Teams", AIAA 3$^{rd}$ "Unmanned Unlimited" Technical Conference, Workshop and Exhibit, Sep. 20-23, 2004, 9 pages.
Wikipedia, "Waze", http://en.wikipedia.org/wiki/Waze, Mar. 30, 2014, 6 pages.
Choi et al., "Information deliver scheme of micro UAVs having limited communication range during tracking the moving target" The Journal of Supercomputing, vol. 66, Issue 2, 2013, pp. 950-972.
Boyd et al., "Convex Optimization", Cambridge University Press, 2004, 730 pages.

* cited by examiner

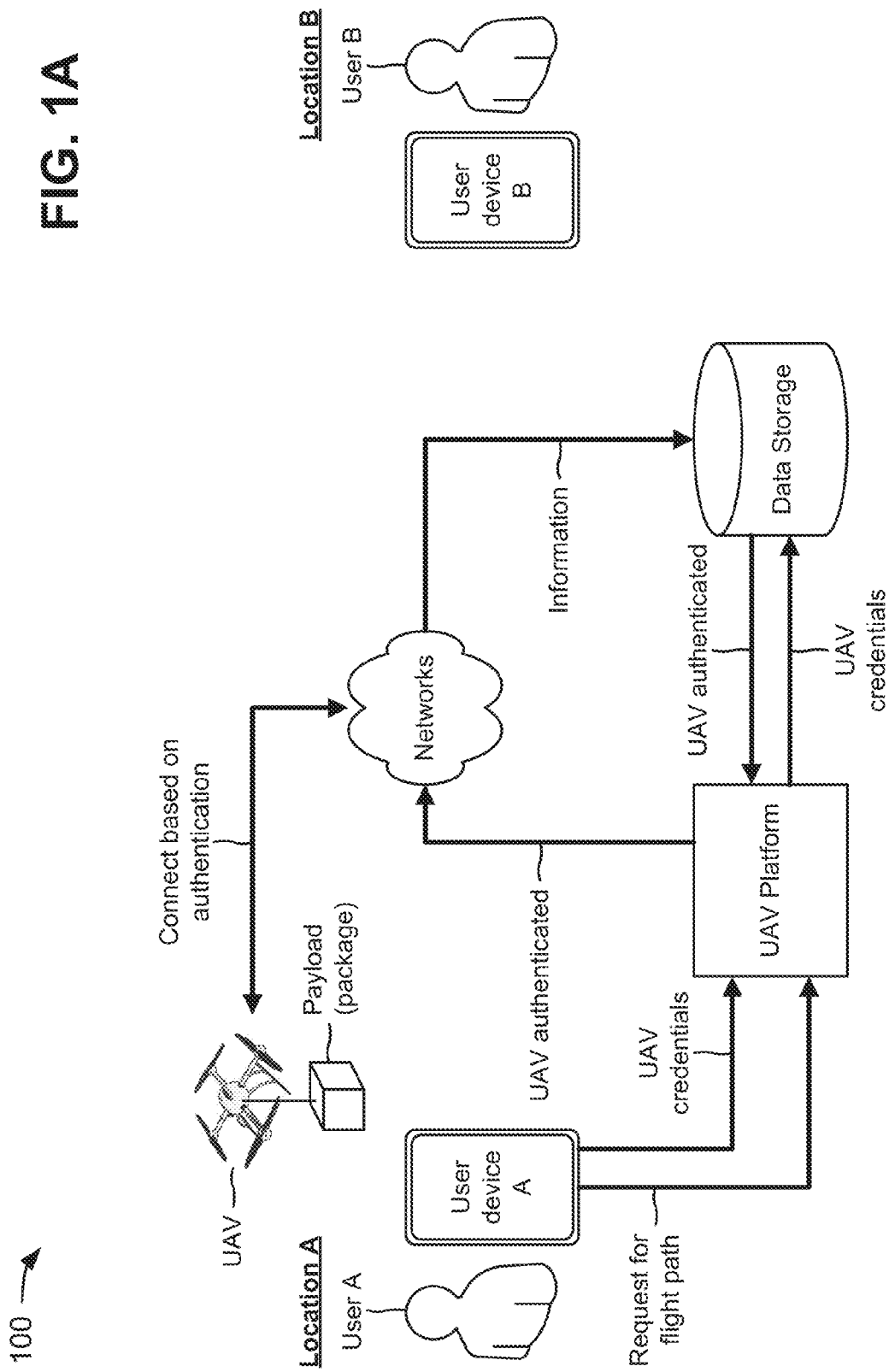

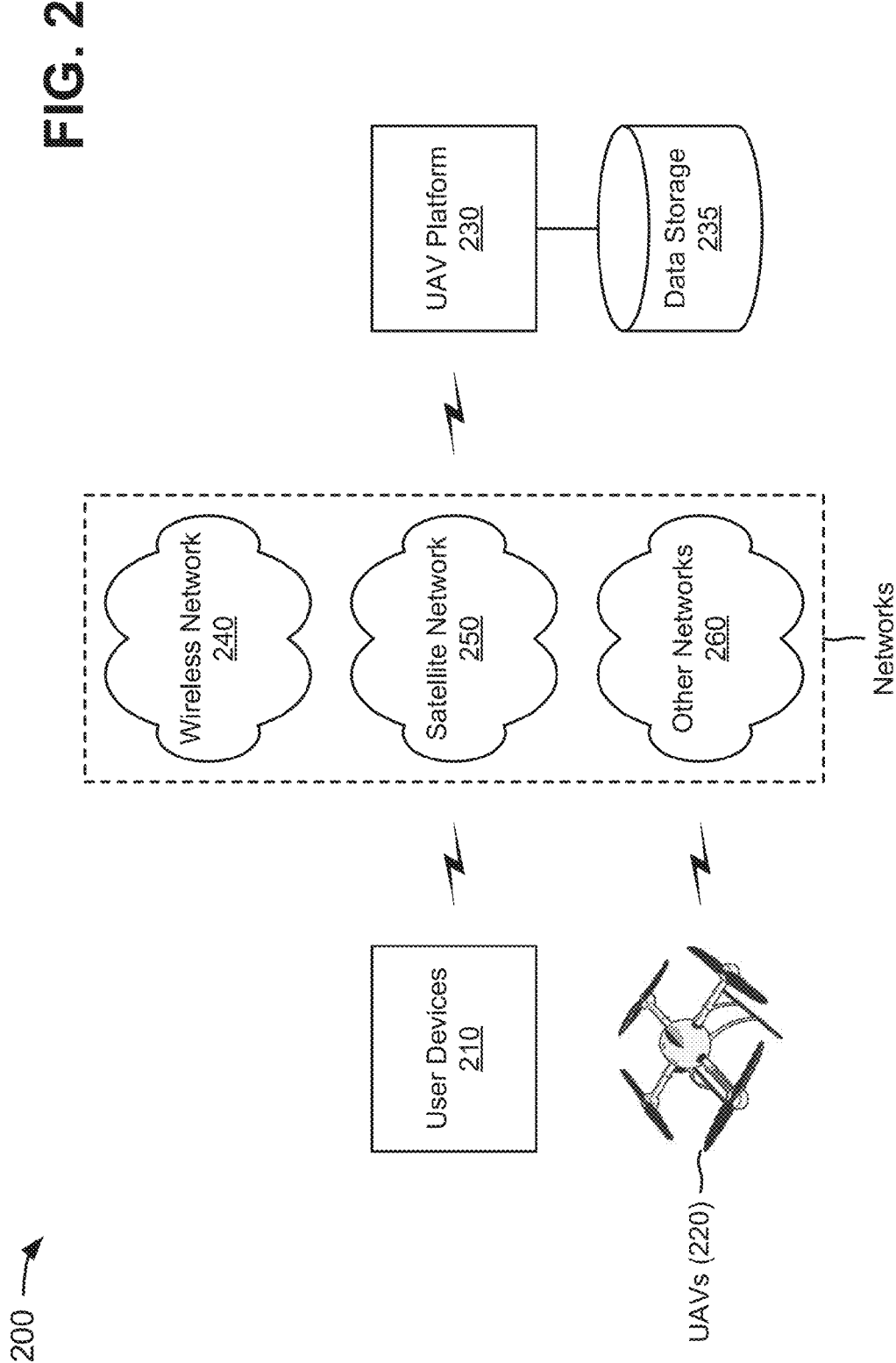

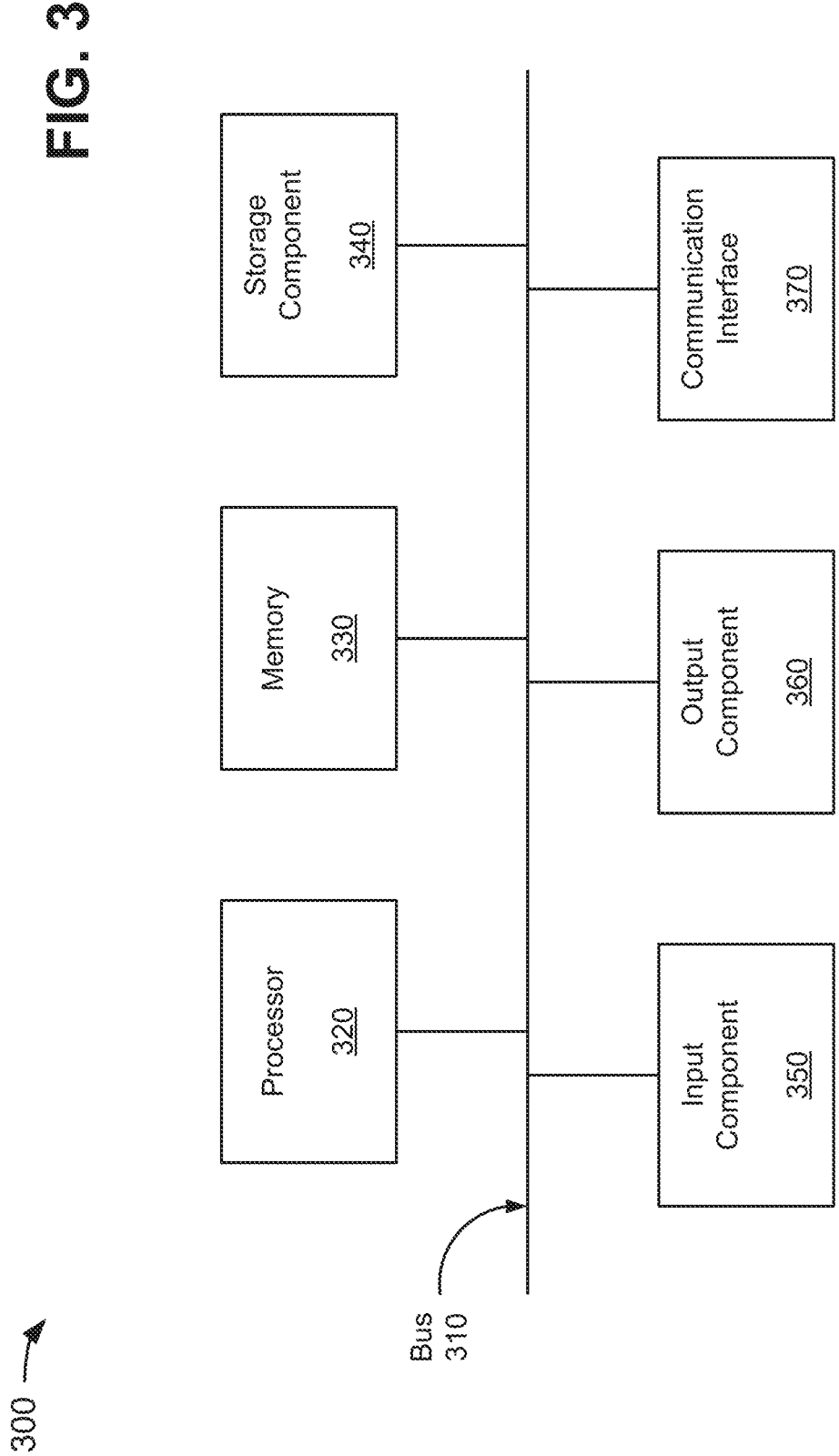

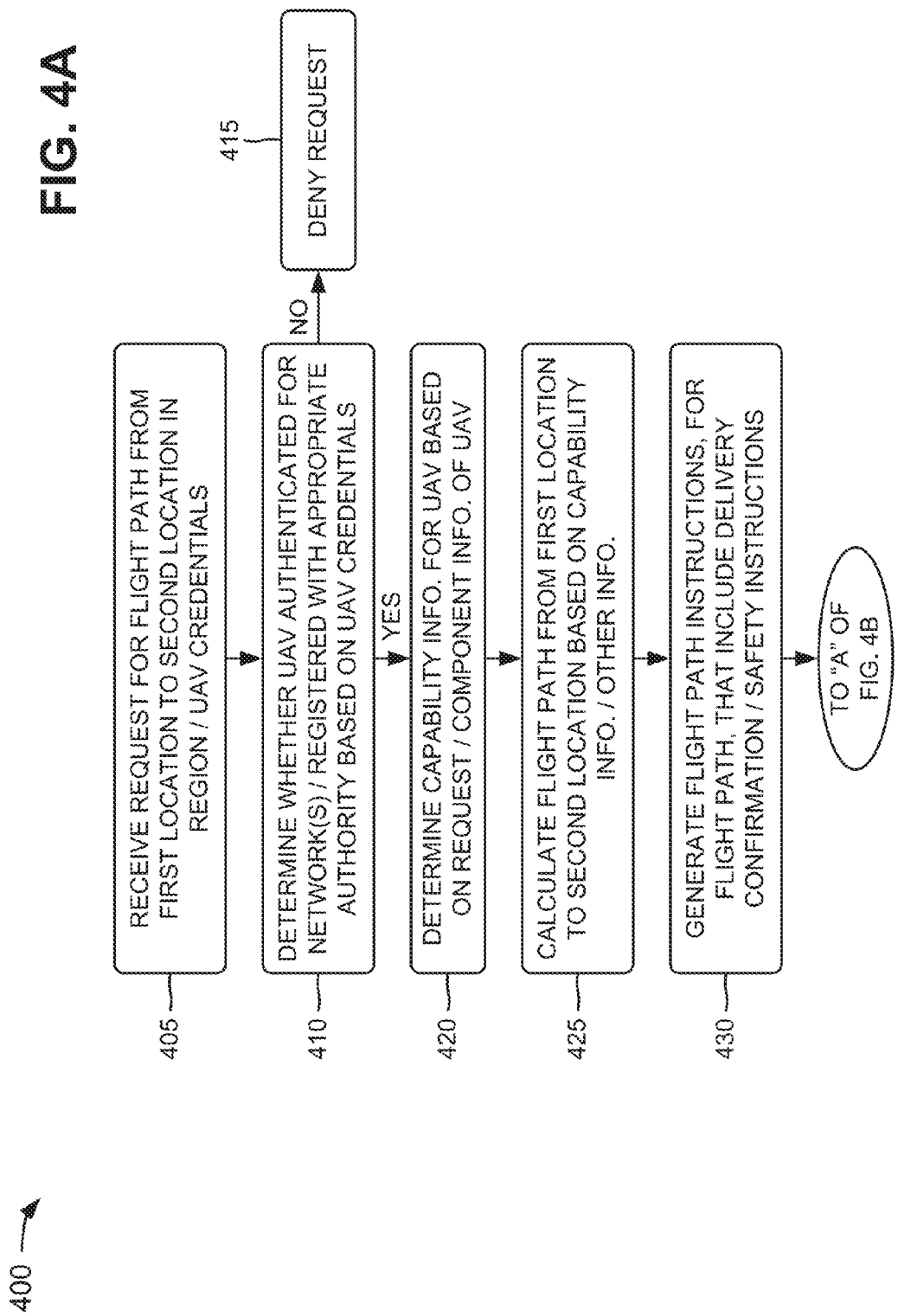

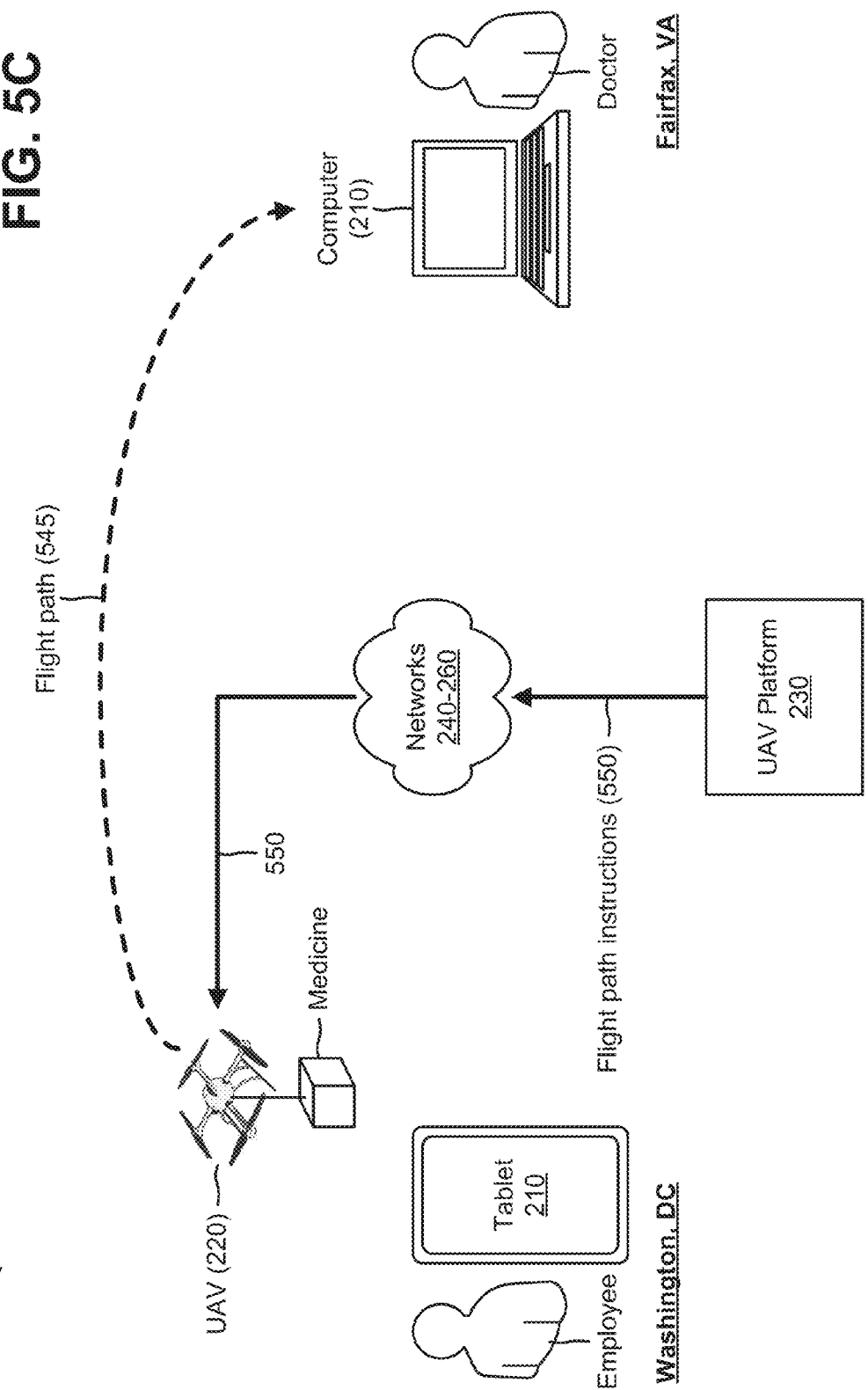

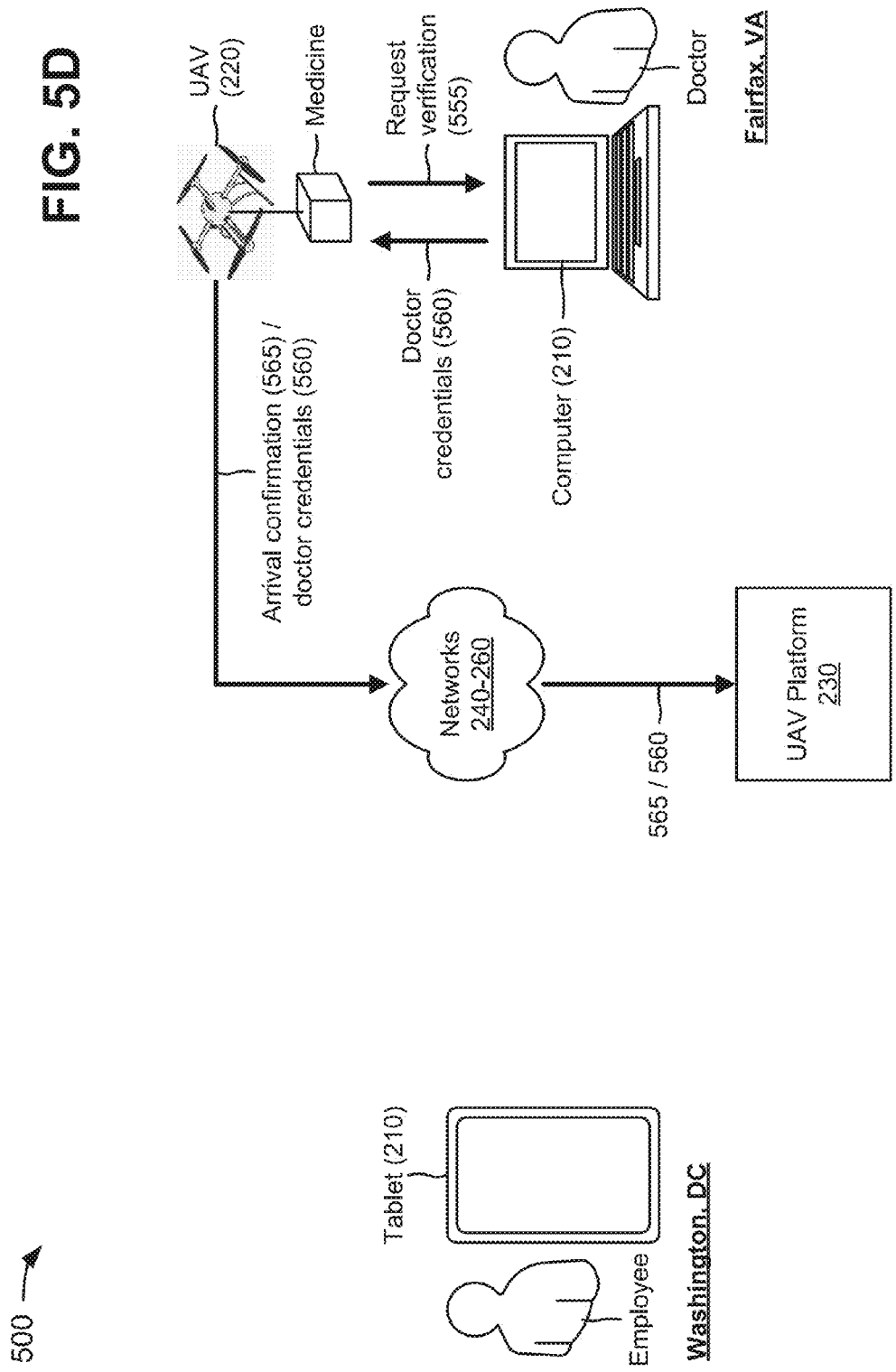

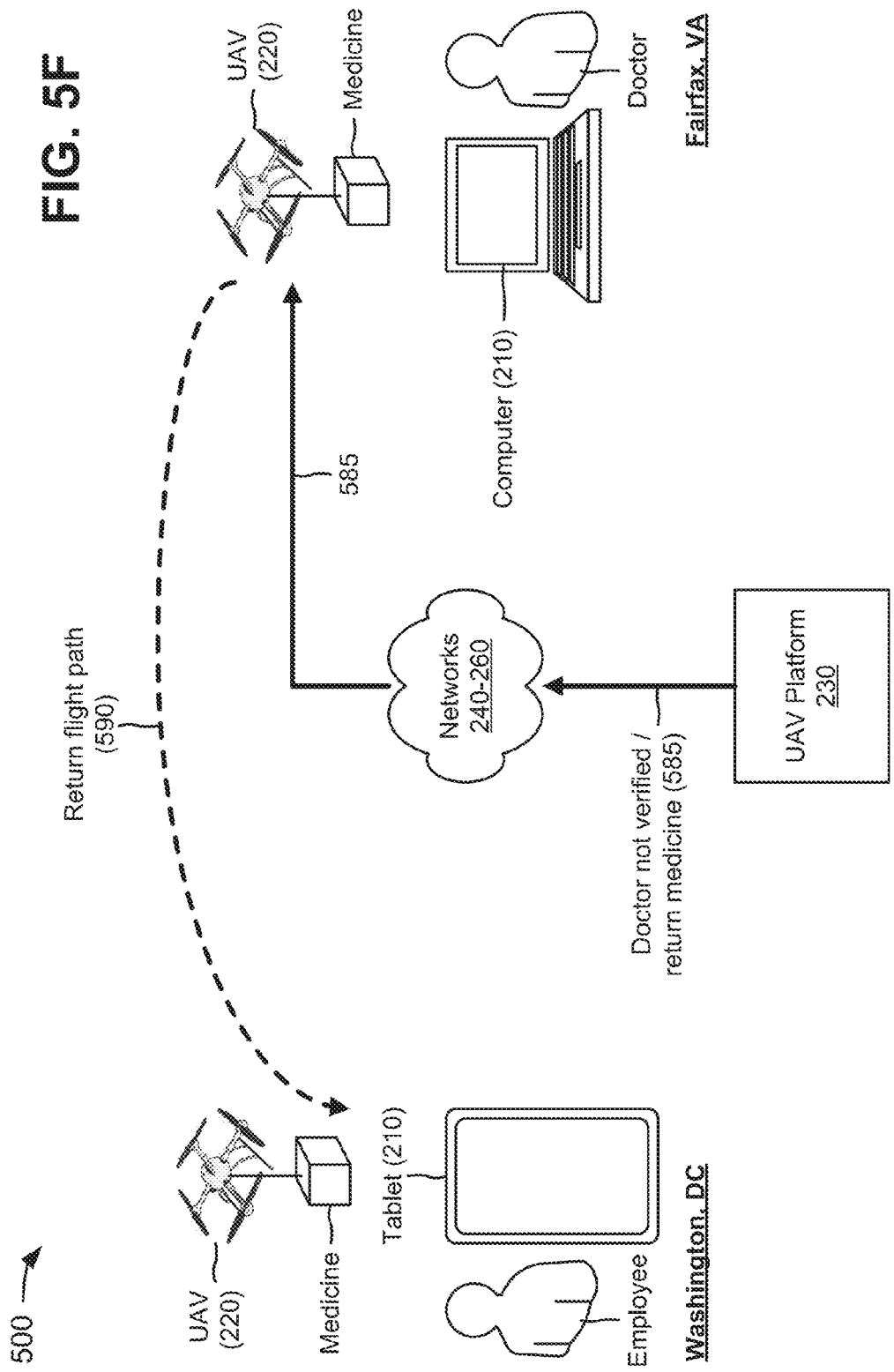

US 9,646,283 B2

SECURE PAYLOAD DELIVERIES VIA UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of civilian applications, such as police surveillance, firefighting, security work (e.g., surveillance of pipelines), surveillance of farms, commercial purposes, etc.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

FIGS. 4A and 4B depict a flow chart of an example process for ensuring that a payload is securely delivered by a UAV; and FIGS. 5A-5F are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1B:
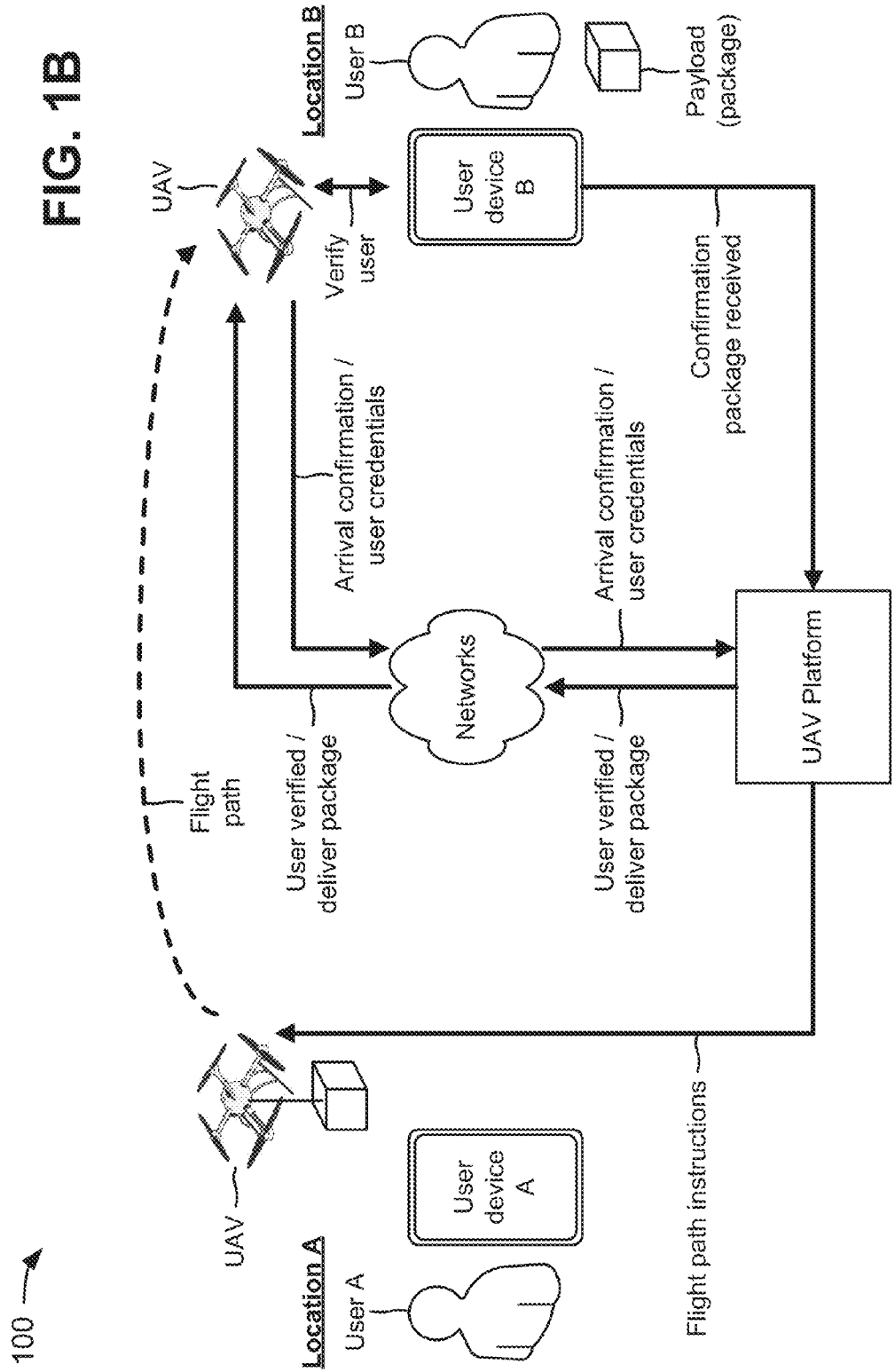

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV from location A to a destination location (e.g., location B) in order to deliver a payload (e.g., a package) to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with UAVs (e.g., thrust, battery life, etc. associated with UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no fly zones, government buildings, etc.) associated with the geographical region; historical information (e.g., former flight paths, former weather, etc.) associated with the geographical region; etc.

As further shown in FIG. 1A, user A may instruct user device A (or the UAV) to generate a request for a flight path (e.g., from location A to location B) for the UAV, and to provide the request to the UAV platform. The request may include credentials (e.g., a serial number, an identifier of a universal integrated circuit card (UICC), etc.) associated with the UAV. The UAV platform may utilize the UAV credentials to determine whether the UAV is authenticated for utilizing the UAV platform and/or one or more of the networks, and is registered with an appropriate authority (e.g., a government agency) for use. For example, the UAV platform may compare the UAV credentials with UAV account information (e.g., information associated with authenticated and registered UAVs) provided in the data storage to determine whether the UAV is authenticated. Assume that the UAV is authenticated for the UAV platform, and that the UAV platform provides, to the networks, a message indicating that the UAV is authenticated and/or authorized. The UAV may connect with the networks based on the authentication/authorization of the UAV.

The UAV platform may utilize information associated with the UAV (e.g., components of the UAV, the requested flight path, etc.) to identify capabilities of the UAV and other information in the data storage. For example, the UAV platform may retrieve capability information associated with the UAV and/or other information (e.g., the weather information, the obstacle information, the regulatory information, the historical information, etc. associated with the geographical region) from the data storage. The UAV platform may calculate the flight path from location A to location B based on the capability information and/or the other information, and may generate flight path instructions for the flight path. For example, the flight path instructions may indicate that the UAV is to fly at an altitude of two-thousand (2,000) meters, for fifty (50) kilometers and fifty-five (55) minutes, and then is to fly at an altitude of one-thousand (1,000) meters, for seventy (70) kilometers and one (1) hour in order to arrive at location B. The flight path instructions may also indicate that the UAV is to verify that user B is the appropriate recipient of the package before delivering the package to user B.

As shown in FIG. 1B, the UAV platform may provide, to the UAV, the flight path instructions. The UAV may take off from location A, and may travel the flight path based on the flight path instructions. When the UAV arrives at location B, the UAV may request user device B and/or user B to verify (e.g., via facial recognition, audio recognition, detection of the presence of user device B, etc.) that user B is the appropriate recipient of the package, and may receive user credentials (e.g., an image of user B, audio provided by user B, information identifying the presence of user device B, etc.) based on the request. The UAV may provide an arrival confirmation (e.g., confirming that the UAV arrived at location B) and the user credentials to the UAV platform, via the networks, as further shown in FIG. 1B.

The UAV platform may determine whether user B is the appropriate recipient of the package based on the user credentials. If the UAV platform determines that user B is not the appropriate recipient of the package (e.g., that user B is not verified), the UAV platform may instruct the UAV to not deliver the package to user B and to leave location B. As further shown in FIG. 1B, if the UAV platform determines that user B is the appropriate recipient of the package (e.g., that user B is verified), the UAV platform may instruct the UAV to deliver the package to user B. The UAV may provide the package to user B, and may leave location B via a return flight path (e.g., back to location A). After the UAV provides the package to user B, the UAV and/or user device B may generate a notification confirming that the package was received by user B, and may provide the notification to the UAV platform.

Systems and/or methods described herein may provide a platform that enables UAVs to safely traverse flight paths from origination locations to destination locations. The systems and/or methods may ensure that the UAVs and/or payloads of the UAVs are not stolen and/or damaged by unauthorized parties, and that the payloads are securely delivered to appropriate parties. The systems and/or methods may also ensure that the payloads are not left unattended for extended periods of time by verifying that authorized recipients are present to accept the payloads.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive a request for a flight path from an origination location to a destination location, and credentials associated with UAV 220. UAV platform 230 may authenticate UAV 220 for use of UAV platform 230 and/or networks 240-260 based on the credentials, and may determine capability information for UAV 220 based on the request and/or component information associated with UAV 220. UAV platform 230 may calculate the flight path from the origination location to the destination location based on the capability information and/or other information (e.g., weather information, air traffic information, etc.), and may generate flight path instructions, for the flight path, that include delivery confirmation and/or safety instructions. UAV platform 230 may provide the flight path instructions to UAV 220, and UAV 220 may traverse the flight path until UAV 220 arrives at the destination location.

When UAV 220 arrives at the destination location, UAV platform 230 may receive, from UAV 220, a confirmation that UAV 220 arrived at the destination location and/or credentials associated with a user located at the destination location. UAV platform 230 may determine whether the user is an appropriate recipient of a payload carried by UAV 220 based on the credentials. If UAV platform 230 determines that the user is the appropriate recipient of the payload, UAV platform 230 may instruct UAV 220 to deliver the payload to the user. If UAV platform 230 determines that the user is not the appropriate recipient of the payload, UAV platform 230 may instruct UAV 220 to not deliver the payload to the user and to leave the destination location.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4B:
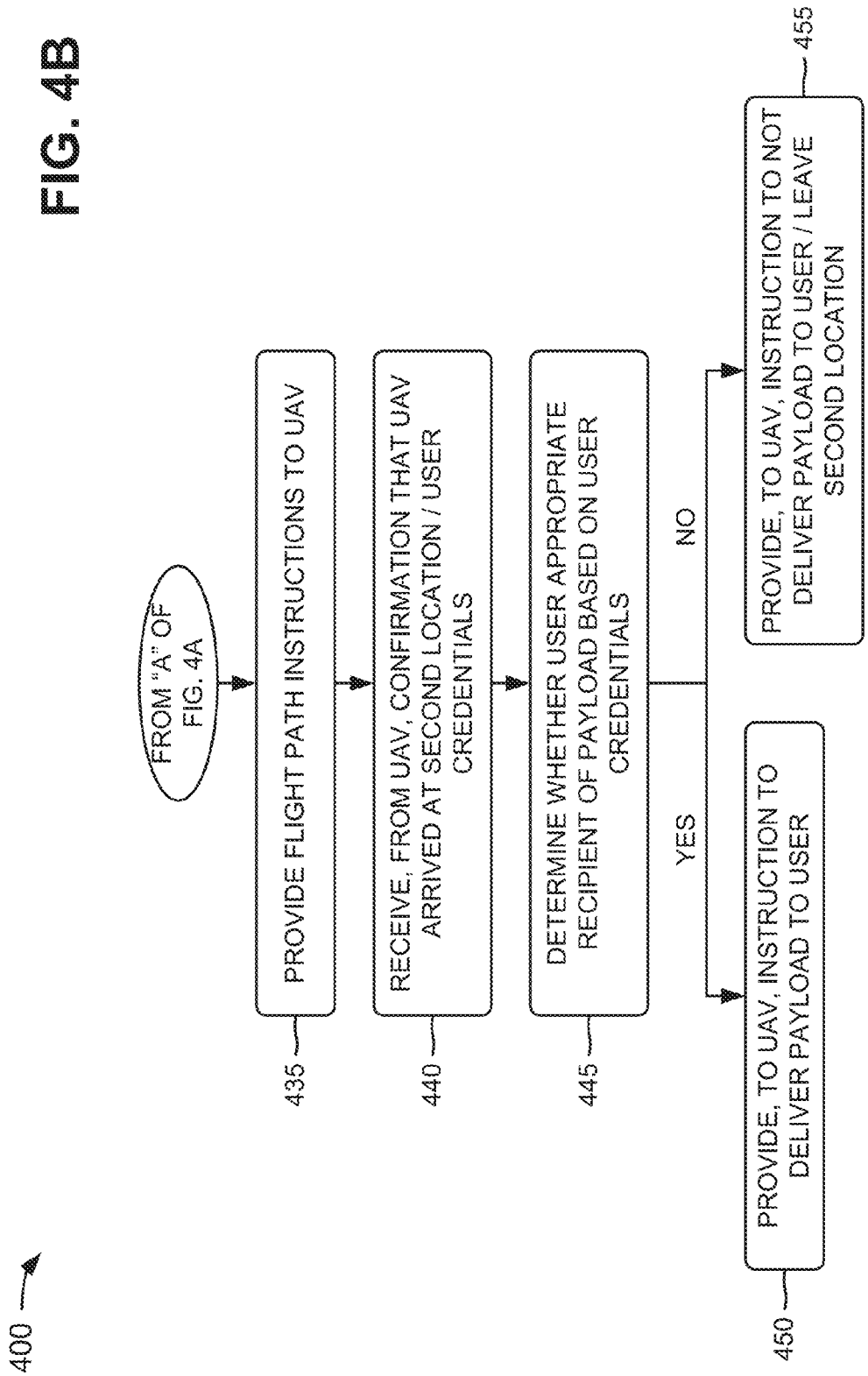

FIGS. 4A and 4B depict a flow chart of an example process 400 for ensuring that a payload is securely delivered by a UAV. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for a flight path from a first location to a second location in a particular region, and credentials of a UAV (block 405). For example, UAV platform 230 may receive a request for a flight path from a first location to a second location in a particular region, and credentials associated with UAV 220. In some implementations, user device 210 may provide information associated with the flight path to UAV 220, and UAV 220 may provide the request for the flight path to UAV platform 230. In some implementations, the request for the flight path may be provided by user device 210 to UAV platform 230. In some implementations, the request for the flight path may include a request for flight path instructions from an origination location (e.g., a current location of UAV 220) to a destination location (e.g., a location in the particular region). The origination location and the destination location may be provided in the particular region. In some implementations, the credentials of UAV 220 may include an identification number, a model number, a serial number, an identifier of a UICC (or another type of smart card), a government registration number, a private encryption key, a public encryption key, a certificate, etc. associated with UAV 220. In some implementations, the credentials of UAV 220 may include information identifying components of UAV 220 (e.g., serial numbers, model numbers, part numbers, etc. of the components).

As further shown in FIG. 4A, process 400 may include determining whether the UAV is authenticated for network(s) and is registered with an appropriate authority based on the UAV credentials (block 410). For example, UAV platform 230 may determine whether UAV 220 is authenticated for using UAV platform 230 and/or one or more of networks 240-260 based on the credentials of UAV 220. In some implementations, UAV platform 230 may compare the credentials of UAV 220 with UAV account information stored in data storage 235 (e.g., information associated with authenticated and registered UAVs 220, such as identification numbers of UAVs 220, public and/or private encryption keys of UAVs 220, account status information, etc.) in order to determine whether UAV 220 is authenticated for using UAV platform 230 and/or one or more of networks 240-260. For example, if the credentials of UAV 220 include a serial number of UAV 220, UAV platform 230 may compare the serial number to the UAV account information in data storage 235 to determine whether UAV 220 is registered with UAV platform 230, whether an account of UAV 220 is in good standing (e.g., paid for), etc. In some implementations, UAV platform 230 may determine whether UAV 220 is authenticated for using UAV platform 230 and/or one or more of networks 240-260 based on a UICC associated with UAV 220.

In some implementations, UAV platform 230 may determine whether UAV 220 is registered with an appropriate authority (e.g., a government agency) based on the credentials of UAV 220. For example, if the credentials of UAV 220 include a government registration number of UAV 220, UAV platform 230 may compare the government registration number to the UAV account information in data storage 235 to determine whether UAV 220 is registered with a government agency to legally fly in airspace regulated by the government agency. In some implementations, UAV 220 may include a common protocol with other UAVs 220. The common protocol may enable UAV 220 to be authenticated for using UAV platform 230 and/or one or more of networks 240-260, to communicate with the other UAVs 220, and/or to be verified as being registered with an appropriate authority. For example, if a particular UAV 220 is flying in an area where the particular UAV 220 loses communication with wireless network 240, UAV 220 may establish communications with other UAVs 220 located near the particular UAV 220 (e.g., via the common protocol). The other UAVs 220 may share information (e.g., received from wireless network 240) with the particular UAV 220 via the communications.

As further shown in FIG. 4A, if the UAV is not authenticated for the network(s) and/or is not registered with an appropriate authority (block 410—NO), process 400 may include denying the request for the flight path (block 415). For example, if UAV platform 230 determines that UAV 220 is not authenticated for using UAV platform 230 and/or one or more of networks 240-260 based on the credentials of UAV 220, UAV platform 230 may deny the request for the flight path. In some implementations, UAV platform 230 may provide, to UAV 220, a notification indicating that the request for the flight path is denied due to UAV 220 not being authenticated for using UAV platform 230 and/or one or more of networks 240-260. In some implementations, UAV platform 230 may determine that UAV 220 is not authenticated for using UAV platform 230 and/or one or more of networks 240-260 when UAV 220 is not registered with UAV platform 230, an account of UAV 220 is not in good standing, etc.

Additionally, or alternatively, if UAV platform 230 determines that UAV 220 is not registered with an appropriate authority based on the credentials of UAV 220, UAV platform 230 may deny the request for the flight path. In some implementations, UAV platform 230 may provide, to UAV 220, a notification indicating that the request for the flight path is denied due to UAV 220 not being registered with an appropriate authority. In some implementations, UAV platform 230 may determine that UAV 220 is not registered with an appropriate authority when UAV 220 fails to provide a government registration number via the credentials of UAV 220.

As further shown in FIG. 4A, if the UAV is authenticated for the network(s) and is registered with an appropriate authority (block 410—YES), process 400 may include determining capability information for the UAV based on the request and component information of the UAV (block 420). For example, if UAV platform 230 determines, based on the credentials of UAV 220, that UAV 220 is authenticated for using UAV platform 230 and/or one or more of networks 240-260, and is registered with an appropriate authority, UAV platform 230 may approve the request for the flight path. In some implementations, UAV platform 230 may determine that UAV 220 is authenticated for using UAV platform 230 and/or one or more of networks 240-260 when UAV 220 is registered with UAV platform 230, an account of UAV 220 is in good standing (e.g., paid for), etc. In some implementations, UAV platform 230 may determine that UAV 220 is registered with an appropriate authority when UAV 220 provides a government registration number that matches a government registration number provided in data storage 235.

In some implementations, if UAV platform 230 approves the request for the flight path, UAV platform 230 may determine capability information for UAV 220 based on the request for the flight path and component information of UAV 220 (e.g., provided with the request for the flight path). For example, data storage 235 may include capability information associated with different components of UAVs 220, such as battery life, thrusts provided by rotors, flight times associated with amounts of fuel, etc. In some implementations, UAV platform 230 may utilize the component information of UAV 220 (e.g., UAV 220 has a particular type of battery, engine, rotors, etc.) to retrieve the capability information for components of UAV 220 from data storage 235. For example, if UAV 220 has a particular type of battery and a particular type of rotor, UAV platform 230 may determine that the particular type of battery of UAV 220 may provide two hours of flight time and that the particular type of rotor may enable UAV 220 to reach an altitude of one-thousand meters.

In some implementations, UAVs 220 may be required to follow a maintenance schedule (e.g., for safety purposes), and may need to be certified (e.g., by a government agency) that the maintenance schedule is followed. Such information may be provided in data storage 235 (e.g., with the capability information). In some implementations, if UAV platform 230 determines that UAV 220 is authenticated for using UAV platform 230 and/or one or more of networks 240-260, and is registered with an appropriate authority, UAV platform 230 may still deny the request for the flight path if UAV platform 230 determines that UAV 220 has not properly followed the maintenance schedule. This may enable UAV platform 230 to ensure that only properly maintained UAVs 220 are permitted to fly, which may increase safety associated with UAVs 220 utilizing airspace.

As further shown in FIG. 4A, process 400 may include calculating the flight path from the first location to the second location based on the capability information and other information (block 425). For example, UAV platform 230 may calculate the flight path from the origination location to the destination location based on the capability information and/or other information (e.g., the weather information, the air traffic information, the obstacle information, the regulatory information, and/or the historical information) stored in UAV platform 230 and/or data storage 235. In some implementations, UAV platform 230 may determine whether the capability information indicates that UAV 220 may safely complete the flight path from the origination location to the destination location without stopping. If UAV platform 230 determines that UAV 220 cannot safely complete the flight path from the origination location to the destination location without stopping (e.g., to recharge or refuel), UAV platform 230 may determine one or more waypoints along the flight path where UAV 220 may stop and recharge or refuel.

In some implementations, UAV platform 230 may calculate the flight path based on the capability information associated with UAV 220 and the weather information. For example, UAV platform 230 may determine that, without weather issues, the flight path may take UAV 220 two hours to complete at an altitude of five-hundred meters. UAV platform 230 may further determine that wind conditions at five-hundred meters may create a headwind of fifty kilometers per hour on UAV 220, but that wind conditions at one-thousand meters may create a tailwind of fifty kilometers per hour on UAV 220. In such an example, UAV platform 230 may alter the flight path from an altitude of five-hundred meters to an altitude of one-thousand meters (e.g., if UAV 220 is capable of reaching the altitude of one-thousand meters). Assume that the tailwind at the altitude of one-thousand meters decreases the flight time from two hours to one hour and thirty minutes. Alternatively, UAV platform 230 may not alter the flight path, but the headwind at the altitude of five-hundred meters may increase the flight time from two hours to two hours and thirty minutes.

Additionally, or alternatively, UAV platform 230 may calculate the flight path based on the capability information associated with UAV 220 and the air traffic information. For example, UAV platform 230 may determine that, without air traffic issues, the flight path may take UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may alter the flight path from an altitude of five-hundred meters to an altitude of one-thousand meters. The altitude of one-thousand meters may enable UAV 220 to safely arrive at the location without the possibility of colliding with other UAVs 220. Alternatively, UAV platform 230 may not alter the flight path, but the other UAVs 220 flying at the altitude of five-hundred meters may increase possibility that UAV 220 may collide with another UAV 220. UAV platform 230 may then determine whether UAV 220 is capable of safely flying at the altitude of five-hundred meters without colliding with another UAV 220.

Additionally, or alternatively, UAV platform 230 may calculate the flight path based on the capability information associated with UAV 220 and the obstacle information. For example, UAV platform 230 may determine that, without obstacle issues, the flight path may take UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may alter the flight path from an altitude of two-hundred meters to an altitude of three-hundred meters. The altitude of three-hundred meters may enable UAV 220 to safely arrive at the location without the possibility of colliding with the one or more buildings. Alternatively, UAV platform 230 may not alter the altitude of the flight path, but may change the flight path to avoid the one or more buildings, which may increase the flight time from one hour to one hour and thirty minutes.

Additionally, or alternatively, UAV platform 230 may calculate the flight path based on the capability information associated with UAV 220 and the regulatory information. For example, UAV platform 230 may determine that, without regulatory issues, the flight path may take UAV 220 one hour to complete at an altitude of five-hundred meters. UAV platform 230 may further determine that the flight path travels over a restricted facility based on the regulatory information. In such an example, UAV platform 230 may change the flight path to avoid flying over the restricted facility, which may increase the flight time from one hour to one hour and thirty minutes.

Additionally, or alternatively, UAV platform 230 may calculate the flight path based on the capability information associated with UAV 220 and the historical information. For example, UAV platform 230 may identify prior flight paths to the location from the historical information, and may select one of the prior flight paths, as the flight path, based on the capability information associated with UAV 220. For example, assume that UAV platform 230 identifies three prior flight paths that include flight times of two hours, three hours, and four hours, respectively, and may determine that UAV 220 may safely fly for two hours and thirty minutes (e.g., based on the capability information). In such an example, UAV platform 230 may select, as the flight path, the prior flight path with the flight time of two hours.

In some implementations, UAV platform 230 may calculate the flight path from the origination location to the destination location based on the capability information, the weather information, the air traffic information, the obstacle information, the regulatory information, and/or the historical information.

As further shown in FIG. 4A, process 400 may include generating flight path instructions, for the flight path, that include delivery confirmation and/or safety instructions (block 430). For example, UAV platform 230 may generate flight path instructions for the flight path. In some implementations, the flight path instructions may include specific altitudes for UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where UAV 220 may stop and recharge or refuel); etc. For example, the flight path instructions may include information that instructs UAV 220 to fly forty-five degrees northeast for ten kilometers at an altitude of five-hundred meters, fly three-hundred and fifteen degrees northwest for ten kilometers at an altitude of four-hundred meters, etc.

In some implementations, the flight path instructions may include delivery confirmation and/or safety instructions associated with delivering a payload of UAV 220 to an appropriate recipient. In some implementations, the delivery confirmation/safety instructions may include information instructing UAV 220 to drop off a payload carried by UAV 220 at the destination location and leave the destination location. In such implementations, UAV 220 may not require confirmation that the payload is received by an appropriate user at the destination location. In some implementations, a recipient of the payload may pay more for sensitive payloads (e.g., controlled substances, such as medicine or drugs, electronics, jewelry, etc.) so that UAV 220 and UAV platform 230 confirms that the sensitive payloads are received by the appropriate users at destination locations.

In some implementations, the delivery confirmation/safety instructions may include information instructing UAV 220 to drop the payload at the destination location without landing (e.g., hovering and releasing the payload). In such implementations, a height at which UAV 220 drops the payload may depend on the contents of the payload (e.g., unbreakable objects, such as medicine pills may be dropped from a greater height than breakable objects, such as electronics). In such implementations, UAV 220 may confirm that user device 210, associated with an appropriate user, is within a particular proximity of UAV 220 before UAV 220 drops the payload at the destination location. Such implementations may prevent damage or theft of UAV 220 at the destination location by malicious parties (e.g., potential thieves).

In some implementations, the delivery confirmation/safety instructions may include information instructing UAV 220 to not land at the destination location if UAV 220 detects (e.g., via cameras, heat detection sensors, or other sensors) the presence of humans and/or animals within a particular distance of UAV 220. In such implementations, UAV 220 may wait until the detected humans and/or animals are no longer within the particular distance before delivering the payload at the destination location. Such implementations may prevent damage or theft of UAV 220 and/or the payload, and may ensure that UAV 220 does not injure the detected humans and/or animals.

In some implementations, the delivery confirmation/safety instructions may include information instructing UAV 220 to deliver the payload at the destination location when a particular wireless local area network (WLAN) (e.g., an IEEE 802.15 (e.g., Bluetooth) network, an IEEE 802.11 (e.g., Wi-Fi) network, a near field communication (NFC) network, etc.) is detected by UAV 220 at the destination location. For example, user device 210 may generate the particular WLAN and/or a device at the destination location may generate the particular WLAN. If UAV 220 detects the particular WLAN, UAV 220 may determine that it is safe to deliver the payload and may deliver the payload.

In some implementations, the delivery confirmation/safety instructions may include information instructing UAV 220 to request verification of a user at the destination location. For example, UAV 220 may request that the user look at a camera of UAV 220 and smile or blink (e.g., to ensure that the user is not utilizing a picture). The camera of UAV 220 may capture the image of the user so that UAV platform 230 may perform facial recognition of the image in order to confirm an identity of the user. In such implementations, UAV platform 230 may include images, of appropriate users, that are provided by the users when establishing an account with UAV platform 230, that are retrieved from social media web sites associated with the users (e.g., the users may provide, to UAV platform 230, access to social media profiles of the users), etc.

In another example, UAV 220 may request that the user at the destination location speak into a microphone of UAV 220. The microphone of UAV 220 may capture the voice of the user so that UAV platform 230 may perform audio recognition of the voice in order to confirm an identity of the user. In such implementations, UAV platform 230 may include audio files, of voices of appropriate users, that are provided by the users when establishing an account with UAV platform 230, that are retrieved from social media web sites associated with the users, etc.

In still another example, UAV platform 230 may provide (e.g., via an email message, a text message, an instant message, etc.) a confirmation code (e.g., a bar code, a quick response (QR) code, a word, a numeric code, an alphabetical code, an alphanumeric code, etc.) and/or an authentication mechanism (e.g., a private and/or public encryption key, a certificate, a password, etc.) to user device 210 at the destination location. UAV platform 230 may request that the user provide the confirmation code and/or the authentication mechanism to UAV 220 when UAV 220 arrives at the destination location. For example, the user may speak the confirmation code and/or the authentication mechanism or may cause user device 210 to provide the confirmation code and/or the authentication mechanism to UAV 220 (e.g., UAV 220 may scan a bar code or a QR code displayed by user device 210). UAV platform 230 may utilize the confirmation code and/or the authentication mechanism in order to confirm an identity of the user.

As shown in FIG. 4B, process 400 may include providing the flight path instructions to the UAV (block 435). For example, UAV platform 230 may provide the flight path instructions to UAV 220. In some implementations, UAV 220 may utilize the flight path instructions to travel via the flight path. For example, UAV 220 may take off at a time specified by the flight path instructions, may travel a route and at altitudes specified by the flight path instructions, may detect and avoid any obstacles encountered in the flight path, etc. until UAV 220 arrives at the destination location. In some implementations, when UAV 220 arrives at the destination location, UAV 220 may execute the delivery confirmation/safety instructions before delivering the payload at the destination location.

In some implementations, if UAV 220 includes sufficient computational resources (e.g., a sufficient degree of autonomy), UAV 220 may utilize information provided by the flight path instructions to calculate a flight path for UAV 220 and to generate flight path instructions. In such implementations, the flight path instructions provided by UAV platform 230 may include less detailed information, and UAV 220 may determine more detailed flight path instructions via the computational resources of UAV 220.

As further shown in FIG. 4B, process 400 may include receiving, from the UAV, confirmation that the UAV arrived at the second location and user credentials (block 440). For example, when UAV 220 arrives at the destination location, UAV 220 may generate a message confirming that UAV 220 has arrived at a geographical location associated with the destination location, and may provide the message to UAV platform 230. UAV platform 230 may receive the message. In some implementations, UAV platform 230 may continuously monitor the location of UAV 220 (e.g., via satellite network 250), and may determine that UAV 220 is at the destination location when a location (e.g., GPS coordinates) associated with UAV 220 is within a particular distance of the destination location (e.g., GPS coordinates of the destination location). In such implementations, UAV 220 need not generate the message confirming that UAV 220 has arrived at the destination location.

In some implementations, when UAV 220 arrives at the destination location, UAV 220 may request (e.g., based on the delivery confirmation/safety instructions) that a user at the destination location (e.g., a recipient of the payload) verify their identity by providing user credentials to UAV 220. In some implementations, UAV 220 may drop off the payload at the destination location without requiring confirmation that the payload is received by an appropriate user at the destination location. In such implementations, UAV 220 may not request user credentials from the user at the destination location.

In some implementations, when UAV 220 arrives at the destination location, UAV 220 may determine (e.g., based on the delivery confirmation/safety instructions) whether a particular WLAN is detected by UAV 220 at the destination location. If UAV 220 detects the particular WLAN, UAV 220 may utilize the detected WLAN as the user credentials, and may provide the user credentials to UAV platform 230.

In some implementations, when UAV 220 arrives at the destination location, UAV 220 may request (e.g., based on the delivery confirmation/safety instructions) that the user look at a camera of UAV 220 and make a gestures (e.g., smile or blink to ensure that the user is not utilizing a picture). The camera of UAV 220 may capture the image of the user, and UAV 220 may provide (e.g., as the user credentials) the image of the user to UAV platform 230.

In some implementations, when UAV 220 arrives at the destination location, UAV 220 may request (e.g., based on the delivery confirmation/safety instructions) that the user speak into a microphone of UAV 220. The microphone of UAV 220 may capture the voice of the user, and UAV 220 may provide (e.g., as the user credentials) the voice of the user to UAV platform 230.

In some implementations, UAV platform 230 may provide (e.g., via an email message, a text message, an instant message, etc.) a confirmation code and/or an authentication mechanism to user device 210 at the destination location. When UAV 220 arrives at the destination location, UAV 220 may request that the user provide the confirmation code and/or the authentication mechanism to UAV 220. For example, the user may speak the confirmation code and/or the authentication mechanism or may cause user device 210 to provide the confirmation code and/or the authentication mechanism to UAV 220. UAV 220 may provide (e.g., as the user credentials) the confirmation code and/or the authentication mechanism, received from the user and/or user device 210, to UAV platform 230.

In some implementations, for increased security, UAV 220 may request two or more forms of user credentials (e.g., a bar code and a password, an encryption key and a QR code, an encryption key and facial recognition, etc.) from the user at the destination location so that UAV platform 230 may verify and/or authenticate an identity of the user.

As further shown in FIG. 4B, process 400 may include determining whether the user is an appropriate recipient of a payload based on the user credentials (block 445). For example, UAV platform 230 may determine whether the user at the destination location is an appropriate recipient of the payload based on the user credentials received from UAV 220. In some implementations, UAV platform 230 may compare the user credentials with user account information stored in data storage 235 (e.g., information associated with authenticated and registered users of UAV platform 230, such as confirmation codes, authentication mechanisms, etc. provided by UAV platform 230 to user devices 210) in order to determine whether the user at the destination location is the appropriate recipient of the payload.

In some implementations, if UAV 220 captures an image of the user at the destination location, UAV platform 230 may perform facial recognition of the image in order to confirm an identity of the user. In such implementations, UAV platform 230 and/or data storage 235 may store images of appropriate users. UAV platform 230, via the facial recognition, may compare the image received from UAV 220 with the stored images in order to determine whether the user at the destination location is the appropriate recipient of the payload. For example, if the image matches a stored image, UAV platform 230 may determine that the user is the appropriate recipient of the payload.

In some implementations, if UAV 220 captures the voice of the user, UAV platform 230 may perform audio recognition of the voice in order to confirm an identity of the user. In such implementations, UAV platform 230 and/or data storage 235 may store audio files of voices of appropriate users. UAV platform 230, via the audio recognition, may compare the voice received from UAV 220 with the stored audio files in order to determine whether the user at the destination location is the appropriate recipient of the payload. For example, if the voice matches a stored audio file, UAV platform 230 may determine that the user is the appropriate recipient of the payload.

In some implementations, if UAV platform 230 provides a confirmation code and/or an authentication mechanism to user device 210 at the destination location, UAV platform 230 may determine whether UAV 220 receives the same confirmation code and/or authentication mechanism from the user or user device 210 at the destination location. For example, if the user or user device 210 provides the confirmation code and/or the authentication mechanism to UAV 220, UAV 220 may provide the received confirmation code/authentication mechanism to UAV platform 230. UAV platform 230 may determine whether the received confirmation code/authentication mechanism is correct in order to confirm that the user is the appropriate recipient of the payload.

As further shown in FIG. 4B, if the user is the appropriate recipient of the payload (block 445—YES), process 400 may include providing, to the UAV, an instruction to deliver the payload to the user (block 450). For example, if UAV platform 230 determines that the user is the appropriate recipient of the payload, UAV platform 230 may provide, to UAV 220, information instructing UAV 220 to deliver the payload to the user. In some implementations, the information provided to UAV 220 may include information indicating that the user's identity is verified and that the user is the appropriate recipient of the payload. In some implementations, UAV 220 may provide the payload to the user at the destination location, based on the information received from UAV platform 230. After UAV 220 provides the payload to the user, user device 210 and/or UAV 220 may provide a notification to UAV platform 230, via one or more of networks 240-260. In some implementations, the notification may indicate that the payload has been received by the user at the destination location. In some implementations, after UAV 220 provides the payload to the user, UAV 220 may return to the origination location or to another location (e.g., a storage location associated with a delivery company).

As further shown in FIG. 4B, if the user is not the appropriate recipient of the payload (block 445—NO), process 400 may include providing, to the UAV, an instruction to not deliver the payload to the user and to leave the second location (block 455). For example, if UAV platform 230 determines that the user is not the appropriate recipient of the payload, UAV platform 230 may provide, to UAV 220, information instructing UAV 220 to not deliver the payload to the user and to leave the destination location. In some implementations, the information provided to UAV 220 may include information indicating that the user's identity is not verified and that the user is not the appropriate recipient of the payload. In some implementations, based on the information received from UAV platform 230, UAV 220 may not provide the payload to the user at the destination location, and may return to the origination location or to another location (e.g., a payload facility associated with a package facility).

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5A:
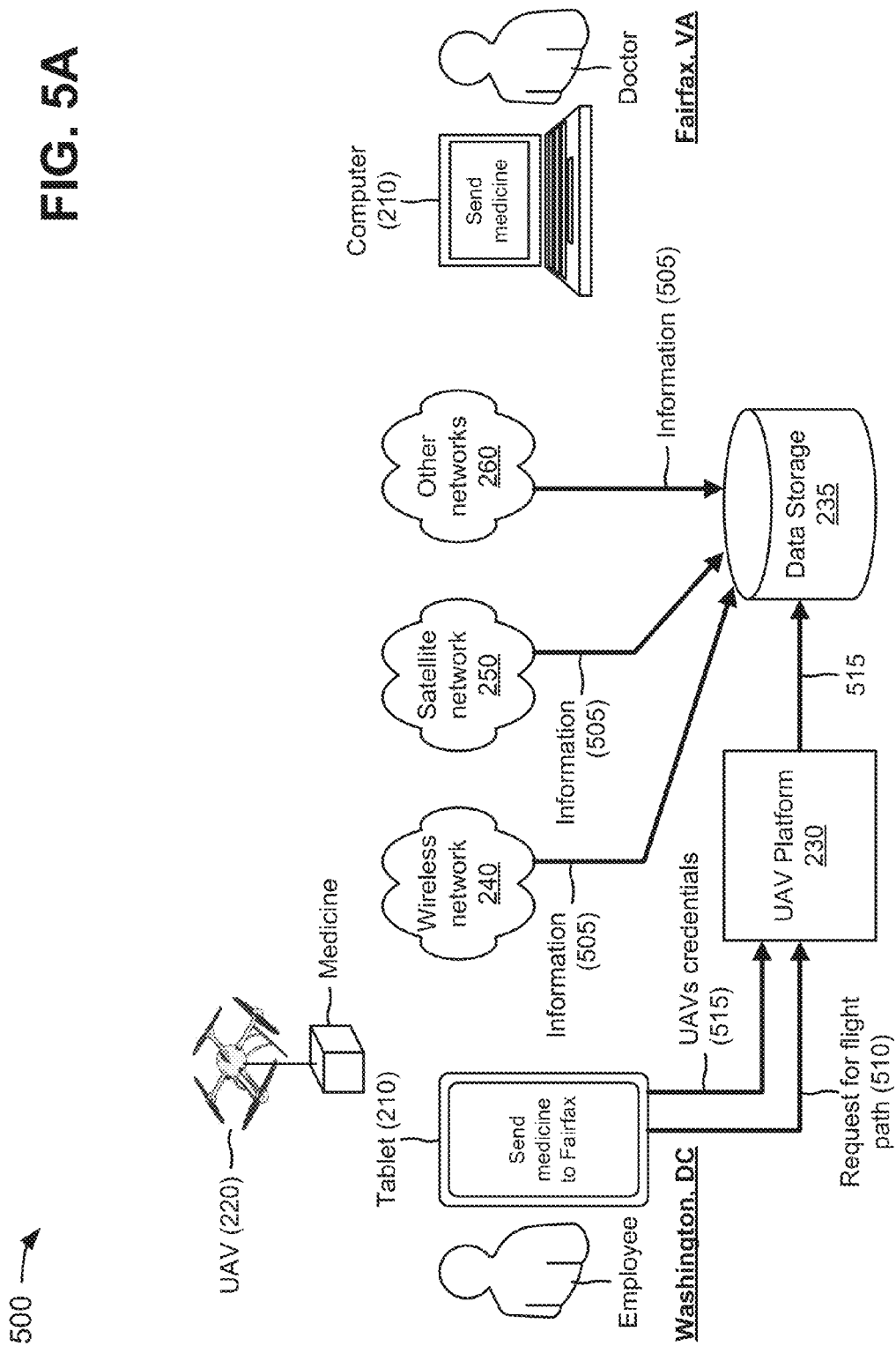

FIGS. 5A-5F are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., a doctor) that is located at a destination location (e.g., a hospital in Fairfax, Va.), and that the doctor has instructed computer 210 to request delivery of a package of medicine to Fairfax, Va. For example, computer 210 may inform tablet 210 (e.g., via one or more servers associated with the delivery company) and the employee that the medicine is to be delivered to the doctor as soon as possible. Further, assume that the employee wants to utilize UAV 220 to fly the medicine from Washington, D.C. to Fairfax, Va. in order to deliver the medicine to the doctor.

As further shown in FIG. 5A, UAV platform 230 and data storage 235 may communicate with wireless network 240, satellite network 250, and/or other networks 260. Wireless network 240, satellite network 250, and/or other networks 260 may provide, to data storage 235, information 505, such as capability information associated with UAV 220, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 (or UAV 220) to generate a request 510 for a flight path (e.g., from Washington, D.C. to Fairfax, Va.) for UAV 220, and to provide request 510 to UAV platform 230. Request 510 may include credentials 515 (e.g., a serial number, an identifier of a UICC, etc. of UAV 220) associated with UAV 220, or credentials 515 may be provided separately from request 510 to UAV platform 230. UAV platform 230 may utilize credentials 515 to determine whether UAV 220 is authenticated for utilizing UAV platform 230 and/or one or more of networks 240-260, and is registered with an appropriate authority for use. For example, UAV platform 230 may compare credentials 515 with information provided in data storage 235 in order to determine whether UAV 220 is authenticated for utilizing UAV platform 230 and/or one or more of networks 240-260, and is registered with an appropriate authority.

Figure 5B:
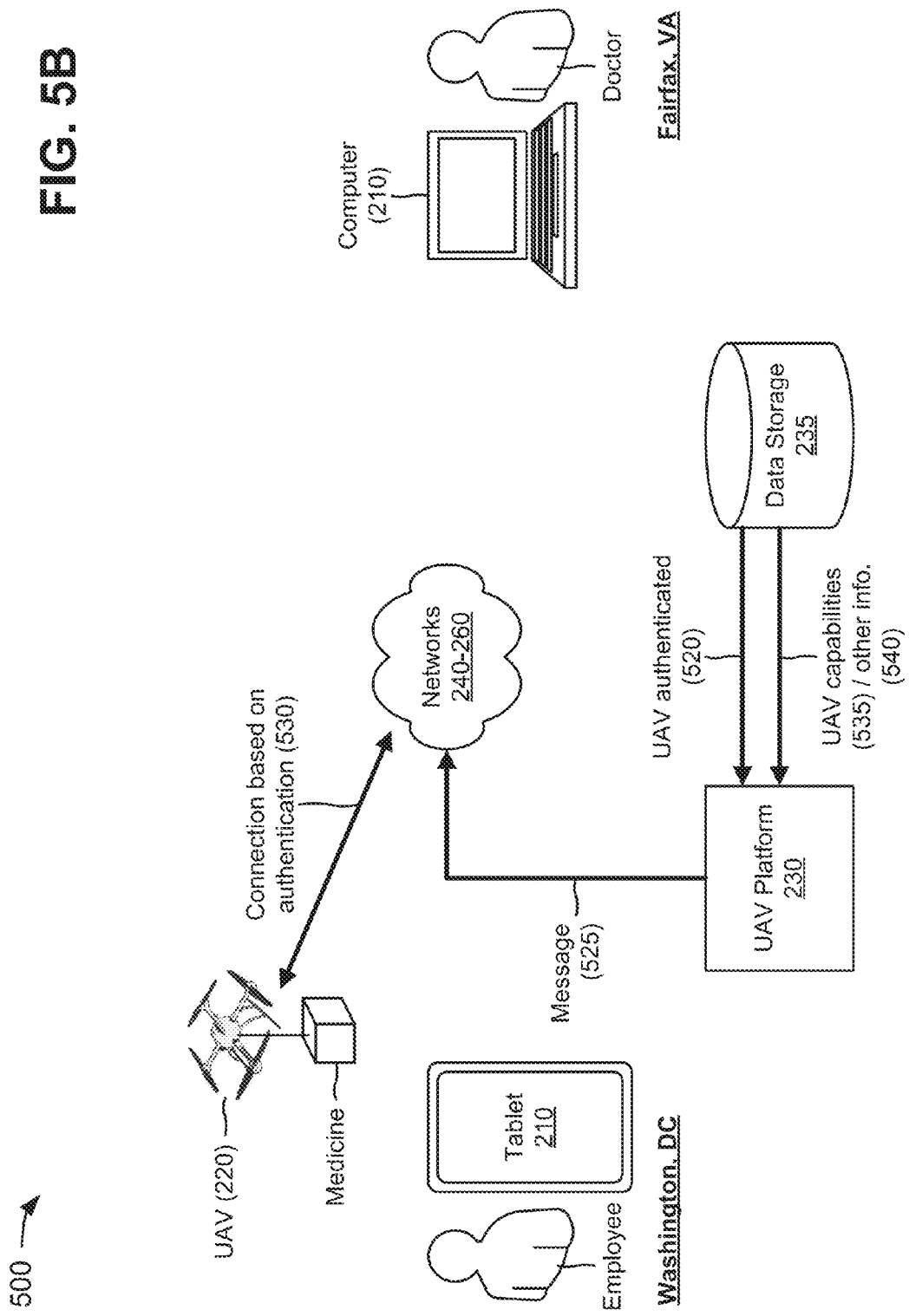

Assume that UAV platform 230 determines that UAV 220 is authenticated for utilizing UAV platform 230 and/or one or more of networks 240-260, and is registered with an appropriate authority, as indicated by reference number 520 in FIG. 5B. Further, assume that UAV platform 230 provides, to networks 240-260, a message 525 indicating that UAV 220 is authenticated to use one or more of networks 240-260. UAV 220 may connect with one or more of networks 240-260 based on the authentication of UAV 220, as indicated by reference number 530. As further shown in FIG. 5B, when UAV platform 230 determines that UAV 220 is authenticated, UAV platform 230 may retrieve capability information 535 associated with UAV 220 and other information 540 (e.g., weather information, air traffic information, obstacle information, regulatory information, and/or historical information) from data storage 235 based on component information of UAV 220 (e.g., provided with request 510).

As shown in FIG. 5C, UAV platform 230 may calculate a flight path 545 from Washington, D.C. to Fairfax, Va. based on capability information 535 and/or other information 540. UAV platform 230 may generate flight path instructions 550 for flight path 545, and may provide flight path instructions 550 to UAV 220 via one or more of networks 240-260. Flight path instructions 550 may include information instructing UAV 220 to fly north at zero degrees for ten kilometers, fly northeast at forty degrees for three kilometers, at an altitude of one-thousand meters, etc. Flight path instructions 550 may also include delivery confirmation and/or safety instructions associated with delivering the medicine to the doctor in Fairfax, Va. Assume that the delivery confirmation/safety instructions instruct UAV 220 to acquire an image of the doctor's face before providing the medicine to the doctor. UAV 220 may take off from Washington, D.C., and may travel flight path 545 based on flight path instructions 550.

As shown in FIG. 5D, when UAV 220 arrives at the hospital in Fairfax, Va., UAV 220 (e.g., based on flight path instructions 550) may provide, to computer 210, a request 555 to verify an identity of the doctor. For example, request 555 may instruct the doctor to look at UAV 220 and smile so that a camera of UAV 220 may capture an image of the doctor's face. The doctor may look at the camera of UAV 220 and smile so that the doctor may provide the image of the doctor's face (e.g., doctor credentials 560) to UAV 220. After receiving doctor credentials 560, UAV 220 may provide an arrival confirmation 565, indicating that UAV 220 arrived at the hospital in Fairfax, Va., and doctor credentials 560, to UAV platform 230 (e.g., via one or more of networks 240-260), as further shown in FIG. 5D.

Figure 5E:
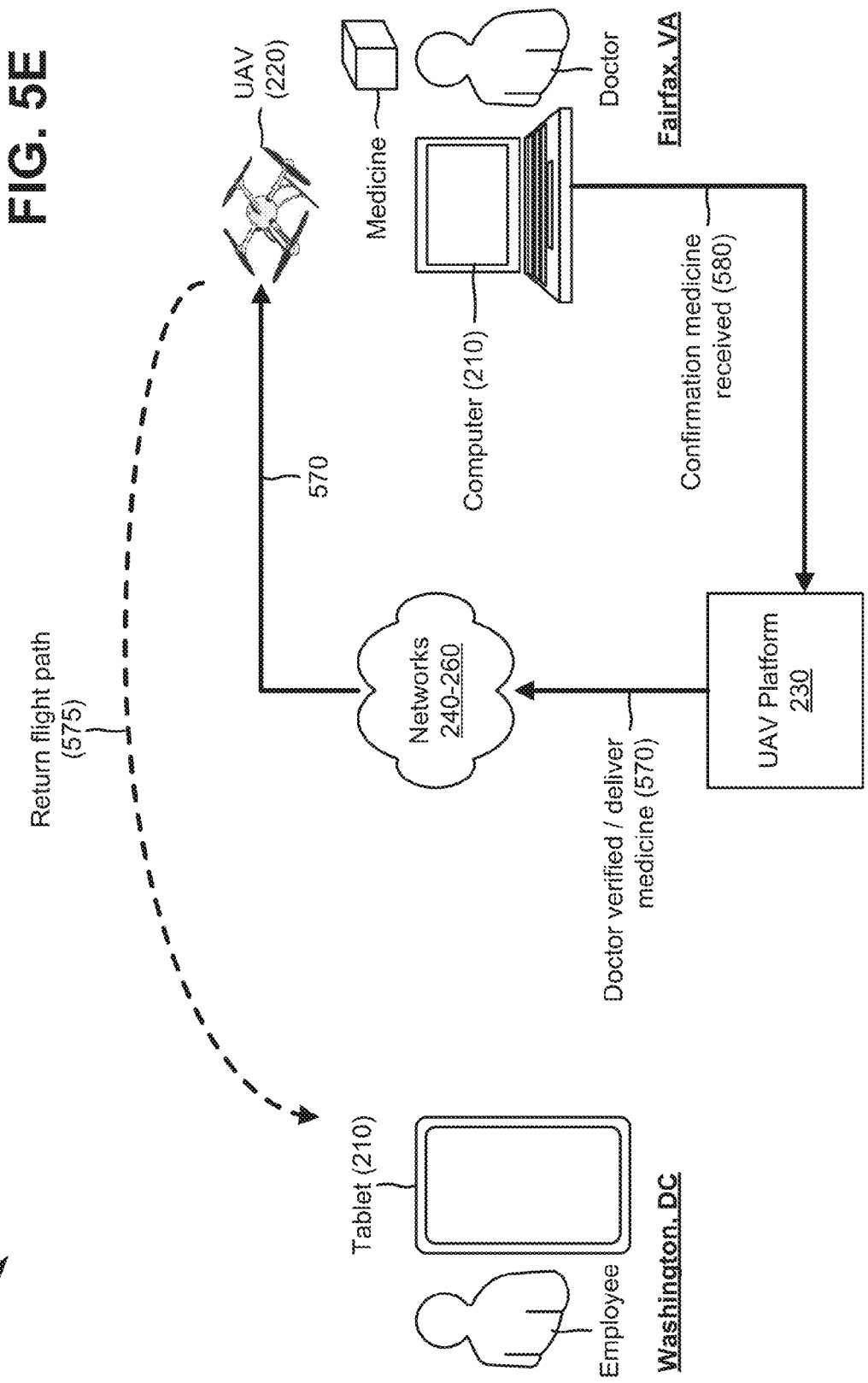

UAV platform 230 may receive doctor credentials 560 and arrival confirmation 565, and may determine whether the doctor is the appropriate recipient of the medicine based on doctor credentials 560. As shown in FIG. 5E, assume that UAV platform 230 determines that the doctor is the appropriate recipient of the medicine since the image of the doctor's face matches at least one image of the doctor stored in UAV platform 230 and/or data storage 235. UAV platform 230 may provide, to UAV 220 (e.g., via one or more of networks 240-260), a message 570 indicating that the doctor is verified as the appropriate recipient of the medicine and instructing UAV 220 to deliver the medicine to the doctor. UAV 220 may receive message 570, and may provide the medicine to the doctor based on message 570. After providing the medicine to the doctor, UAV 220 may return to Washington, D.C. via a return flight path 575 specified by UAV platform 230 (e.g., via message 570). As further shown in FIG. 5E, UAV 220 and/or computer 210 (e.g., via the doctor's input) may generate a notification 580 confirming that the medicine was received by the doctor, and may provide notification 580 to UAV platform 230.

In some implementations, the hospital may include a particular number of employees that are authorized to accept delivery of the medicine from UAV 220. In such implementations, UAV 220 may capture an image of a face of a hospital employee attempting to accept delivery of the medicine, and may provide the captured image to UAV platform 230. UAV platform 230 may compare the captured image to facial images of hospital employees authorized to accept delivery of the medicine to determine if the captured image matches one of the facial images. If UAV platform 230 determines a match for the captured image, UAV platform 230 may instruct UAV 220 to provide the medicine to the hospital employee attempting to accept delivery of the medicine.

In some implementations, the hospital may include a particular number of employees that are waiting for delivery of different medicines from different UAVs 220. In such implementations, UAV 220 may attempt to authenticate the particular number of employees or may request that the authorized employee (e.g., the doctor) for the medicine step forward to be authenticated by UAV 220 and UAV platform 230.

As shown in FIG. 5F, now assume that UAV platform 230 determines that the doctor is not the appropriate recipient of the medicine since the image of the doctor's face failed to match at least one image of the doctor stored in UAV platform 230 and/or data storage 235. UAV platform 230 may provide, to UAV 220 (e.g., via one or more of networks 240-260), a message 585 indicating that the doctor is not verified as the appropriate recipient of the medicine and instructing UAV 220 to return the medicine to the employee in Washington, D.C. UAV 220 may receive message 585, and may return, with the medicine, to Washington, D.C. via a return flight path 590 specified by UAV platform 230 (e.g., in message 585).

As indicated above, FIGS. 5A-5F are provided merely as an example. Other examples are possible and may differ from what was described with regard to FIGS. 5A-5F.

Systems and/or methods described herein may provide a platform that enables UAVs to safely traverse flight paths from origination locations to destination locations. The systems and/or methods may ensure that the UAVs and/or payloads of the UAVs are not stolen and/or damaged, and that the payloads are securely delivered to appropriate recipients. The systems and/or methods may also ensure that the payloads are not left unattended for extended periods of time by verifying that authorized recipients are present to accept the payloads.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a request for a flight path for an unmanned aerial vehicle to travel from a first geographical location to a second geographical location;
   determining, by the device, capability information for the unmanned aerial vehicle based on component information associated with the unmanned aerial vehicle;
   calculating, by the device, the flight path from the first geographical location to the second geographical location based on the capability information;
   generating, by the device, flight path instructions, for the flight path, that include delivery confirmation instructions;
   transmitting, by the device, the flight path instructions to the unmanned aerial vehicle to permit the unmanned aerial vehicle to travel, based on the flight path instructions, from the first geographical location to the second geographical location to deliver a payload;
   obtaining, by the device and based on the delivery confirmation instructions, user credentials associated with a user at the second geographical location,
   the user credentials including at least one of:
      an image of the user captured by the unmanned aerial vehicle, or
      an audio file, of a voice of the user, captured by the unmanned aerial vehicle;
   determining, by the device, whether the user is an authorized recipient of the payload, based on the user credentials; and
   controlling, by the device, the unmanned aerial vehicle to selectively deliver the payload to the user based on whether the user is the authorized recipient of the payload.

2. The method of claim 1, where the user credentials are received from the user by the unmanned aerial vehicle and transmitted by the unmanned aerial vehicle to the device.

3. The method of claim 1, where the controlling the unmanned aerial vehicle to selectively deliver the payload includes:
   controlling the unmanned aerial vehicle to deliver the payload to the user when the user is the authorized recipient of the payload; or
   controlling the unmanned aerial vehicle to not deliver the payload to the user and to leave the second geographical location when the user is not the authorized recipient of the payload.

4. The method of claim 1, further comprising:
   receiving a notification indicating that the payload is delivered to the user when the user is the authorized recipient of the payload.

5. The method of claim 1, where the user credentials further include at least one of:
   a confirmation code transmitted to a user device associated with the user, or
   an authentication mechanism transmitted to the user device.

6. The method of claim 5, where:
   the confirmation code includes at least one of:
      a bar code,
      a quick response (QR) code,
      a word,
      a numeric code,
      an alphabetical code, or
      an alphanumeric code; and
   the authentication mechanism includes at least one of:
      a private encryption key,
      a public encryption key,
      a certificate, or
      a password.

7. The method of claim 1, where the determining whether the user is the authorized recipient of the payload comprises at least one of:
   determining, based on facial recognition, whether the image of the user captured by the unmanned aerial vehicle matches another image stored by the device;
   determining, based on audio recognition, whether the audio file, of the voice of the user, captured by the unmanned aerial vehicle, matches another audio file stored by the device;
   determining whether a confirmation code, transmitted to a user device associated with the user, is received by the unmanned aerial vehicle; or
   determining whether an authentication mechanism, transmitted to the user device, is received by the unmanned aerial vehicle.

8. A device, comprising:
a memory to store instructions; and
one or more processors, to execute the instructions, to:
   receive a request for a flight path for an unmanned aerial vehicle to travel from a first geographical location to a second geographical location in a region;
   determine capability information for the unmanned aerial vehicle based on component information associated with the unmanned aerial vehicle;
   calculate the flight path from the first geographical location to the second geographical location based on the capability information and based on one or more of weather information, air traffic information, obstacle information, or regulatory information associated with the region;
   generate flight path instructions, for the flight path, that include delivery confirmation instructions;
   transmit the flight path instructions to the unmanned aerial vehicle to permit the unmanned aerial vehicle to travel, based on the flight path instructions, from the first geographical location to the second geographical location to deliver a payload;
   obtain, based on the delivery confirmation instructions, user credentials associated with a user at the second geographical location,
      the user credentials including at least one of:
         an image of the user captured by the unmanned aerial vehicle, or
         an audio file, of a voice of the user, captured by the unmanned aerial vehicle;
   determine whether the user is an authorized recipient of the payload, based on the user credentials; and
   control the unmanned aerial vehicle to selectively deliver the payload to the user based on whether the user is the authorized recipient of the payload.

9. The device of claim 8, where the user credentials are received from the user by the unmanned aerial vehicle and transmitted by the unmanned aerial vehicle to the device.

10. The device of claim 8, where, when controlling the unmanned aerial vehicle to selectively deliver the payload, the one or more processors are to:
   control the unmanned aerial vehicle to deliver the payload to the user when the user is the authorized recipient of the payload; or
   control the unmanned aerial vehicle to not deliver the payload to the user and to leave the second geographical location when the user is not the authorized recipient of the payload.

11. The device of claim 8, where the one or more processors are further to:
   receive a notification indicating that the payload is delivered to the user when the user is the authorized recipient of the payload.

12. The device of claim 8, where the user credentials further include at least one of:
   a confirmation code transmitted to a user device associated with the user, or
   an authentication mechanism transmitted to the user device.

13. The device of claim 8, where the one or more processors are further to:
   instruct the unmanned aerial vehicle to not deliver the payload unless the authorized recipient is visible to the unmanned aerial vehicle; or
   instruct the unmanned aerial vehicle to scan the second geographical location for humans or animals and to not deliver the payload if any humans or animals are present at the second geographical location.

14. The device of claim 8, where, when determining whether the user is the authorized recipient of the payload, the one or more processors are to at least one of:
   determine, based on facial recognition, whether the image of the user captured by the unmanned aerial vehicle matches another image stored by the device;
   determine, based on audio recognition, whether the audio file, of the voice of the user, captured by the unmanned aerial vehicle, matches another audio file stored by the device;
   determine whether a confirmation code, transmitted to a user device associated with the user, is received by the unmanned aerial vehicle; or
   determine whether an authentication mechanism, transmitted to the user device, is received by the unmanned aerial vehicle.

15. A non-transitory computer-readable medium for storing instructions, the instructions comprising:
   one or more instructions that, when executed by one or more processors of a device, cause the one or more processors to:
      receive a request for a flight path for an unmanned aerial vehicle to travel from a first geographical location to a second geographical location;
      determine capability information for the unmanned aerial vehicle based on component information associated with the unmanned aerial vehicle;
      calculate the flight path from the first geographical location to the second geographical location based on the capability information;
      generate flight path instructions, for the flight path, that include delivery confirmation instructions;
      transmit the flight path instructions to the unmanned aerial vehicle to permit the unmanned aerial vehicle to travel, based on the flight path instructions, from the first geographical location to the second geographical location to deliver a payload;
      obtain, based on the delivery confirmation instructions, user credentials associated with a user at the second geographical location,
         the user credentials including at least one of:
            an image of the user captured by the unmanned aerial vehicle, or
            an audio file, of a voice of the user, captured by the unmanned aerial vehicle;
      determine whether the user is an authorized recipient of the payload, based on the user credentials; and
      control the unmanned aerial vehicle to selectively deliver the payload to the user based on whether the user is the authorized recipient of the payload.

16. The non-transitory computer-readable medium of claim 15, where the user credentials are received from the user by the unmanned aerial vehicle and transmitted by the unmanned aerial vehicle to the device.

17. The non-transitory computer-readable medium of claim 15, where the one or more instructions that cause the one or more processors to control the unmanned aerial vehicle to selectively deliver the payload comprise:
   one or more instructions that, when executed by the one or more processors, cause the one or more processors to:
      control the unmanned aerial vehicle to deliver the payload to the user when the user is the authorized recipient of the payload; or control the unmanned aerial vehicle to not deliver the payload to the user and to leave the second geographical location when the user is not the authorized recipient of the payload.

18. The non-transitory computer-readable medium of claim 15, where the instructions further comprise:
one or more instructions that, when executed by the one or more processors, cause the one or more processors to at least one of:
instruct the unmanned aerial vehicle to not deliver the payload unless the authorized recipient is visible to the unmanned aerial vehicle; or
instruct the unmanned aerial vehicle to scan the second geographical location for humans or animals and to not deliver the payload if any humans or animals are present at the second geographical location.

19. The non-transitory computer-readable medium of claim 15, where the instructions further comprise:
one or more instructions that, when executed by the one or more processors, cause the one or more processors to at least one of:
instruct the unmanned aerial vehicle to scan the second geographical location for a particular wireless local area network, as the user credentials, and to deliver the payload only when the particular wireless local area network is detected; or
instruct the unmanned aerial vehicle to scan the second geographical location for a particular user device, as the user credentials, and to deliver the payload only when the particular user device is detected.

20. The non-transitory computer-readable medium of claim 15, where the instructions further comprise:
one or more instructions that, when executed by the one or more processors, cause the one or more processors to at least one of:
instruct unmanned aerial vehicle to hover and drop the payload at the second geographical location; or
transmit, to a user device, associated with the user, a notification indicating that the unmanned aerial vehicle is at the second geographical location and receive an instruction to deliver the payload from the user, via the user device and based on the notification.

* * * * *